Oct. 27, 1925.

S. F. EVELYN 1,558,798

PUMP HOUSING AND OPERATING MECHANISM

Filed March 27, 1922

INVENTOR.
STEVEN F EVELYN.
BY Albert C. Bee
ATTORNEY.

Patented Oct. 27, 1925.

1,558,798

UNITED STATES PATENT OFFICE.

STEVEN F. EVELYN, OF DETROIT, MICHIGAN, ASSIGNOR TO CONTINENTAL MOTORS CORPORATION, OF DETROIT, MICHIGAN, A CORPORATION OF VIRGINIA.

PUMP HOUSING AND OPERATING MECHANISM.

Application filed March 27, 1922. Serial No. 547,334.

*To all whom it may concern:*

Be it known that I, STEVEN F. EVELYN, a citizen of the United States, residing at Detroit, in the county of Wayne and State of Michigan, have invented a new and useful Improvement in Pump Housings and Operating Mechanisms, of which the following is a specification.

My invention relates to an improved construction for supporting one of the pumps used for motor vehicles and an improved means for driving the pump from one of the shafts of the motor used in connection with the vehicle.

Heretofore, as far as I am aware, the oil pump for forcing the oil through the lubricating system in connection with motor vehicles has usually been mounted on the base of the motor or a similar place affording a good support for the pump and permitting it to be connected by gearing of some kind with parts driven by the motor. In fact where toothed gearing is employed to drive the pump shaft it is requisite that the pump shall be mounted in that manner in order that the degree of accuracy required to make the gearing operate properly may be attained in locating the pump. This construction besides requiring the accuracy of workmanship referred to, also occupies considerable space and by my invention I provide a driving mechanism by which the pump may be positively driven without using belts or chains and which at the same time does not require accurate alignment or relation of the pump shaft to the driving shaft and I preferably employ in connection with the driving mechanism referred to, a support for the pump by which it is removably secured to the gear case of the motor without increasing the size of the case. Thus with my construction although the gear case itself may be secured to the motor without great accuracy and although the pump support may be secured to the gear case without accurate fitting, the pump may be driven positively and effectively.

Figure 1:
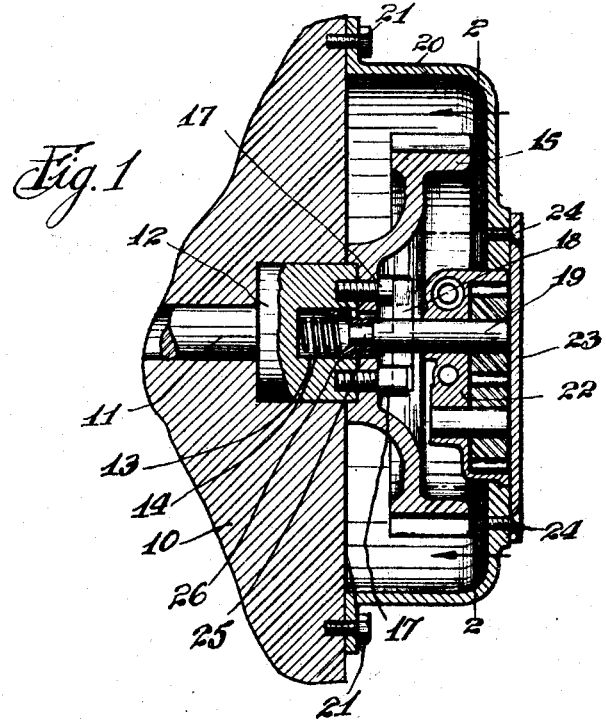
Figure 2:
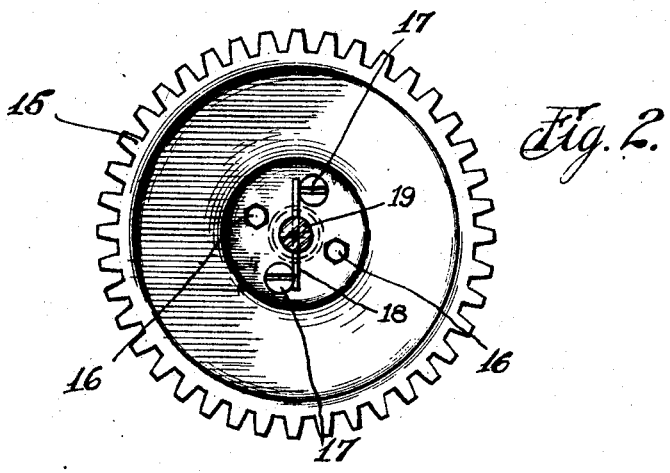

My invention will best be understood by reference to the accompanying drawings showing a preferred embodiment thereof in which Fig. 1 is a vertical sectional view through a part of a motor housing and one of the shafts thereof and through a gear mounted on said shaft and a gear case surrounding the gear, showing my pump and driving mechanism in its relation to the shaft and gear case, and Fig. 2 shows in elevation the gear shown in Fig. 1 and the driving mechanism connected therewith, this view taken along the line 2—2 in Fig. 1.

Similar numerals refer to similar parts throughout the several views.

As shown in the drawings a motor housing is illustrated diagrammatically at 10 and a portion 11 of one of the shafts of the motor is shown supported in the housing, for example the cam shaft of the motor. The end portion of the shaft has secured thereto and preferably formed integrally therewith an enlarged head or boss 12 in which a bore 13 is formed to receive a helical spring 14. The head 12 preferably projects beyond the face of the motor housing and has secured to its end a gear 15 by which the shaft 11 is driven, the gear being secured to the head by screws 16 and 17. The central portion of the gear is bored to substantially the size of the bore 13. The screws 17 are provided with heads which are considerably longer than the heads of the screw 16 for engaging a bar 18 projecting radially from and carried by the pump shaft 19. The gear 15 is enclosed by a casing 20, which may be a part of the casing enclosing the timing gears, by suitable screws 21. The casing 20 has formed therethrough substantially in line with the shaft 11, an opening sufficiently large so that the oil pump 22 may be inserted through the opening and mounted partly in the opening and partly in a recess formed within the rim of the gear 15. The pump 22 is secured to a plate 23 in a suitable manner not shown, which plate serves as a cover plate for the opening in the gear case 20 and this cover plate is held in place on the gear case by screws 24.

The end of the pump shaft 19 is shouldered as indicated at 25, to support a cup 26 for receiving one end of the spring 14, the other end of which engages the bottom of the bore 13 with the spring in somewhat compressed condition when the pump and cover plate are in place on the gear case. For the relation of the parts described the driving bar 18 clears the heads of the screws 16, but lies in the path of portions of the heads of the screws 17 extending beyond the heads of the screws 16 and thus when the gear 15 is driven by the motor the heads of the screws 17 engage the end portions of the bar 18 and rotate the latter and thus rotate the shaft 19 to drive the pump. It will be understood that the pump shaft 19 may be a loose fit in the bore 13, the function of the spring 14 being to hold the head 12 of the shaft 11 against its seat and prevent rattling of the parts.

It will be observed that the shaft 19 need not be in line with the shaft 11 to secure effective driving of said shaft and that the shafts may be considerably out of line without interfering with this driving operation since the bar 18 and the heads of the screws 17 in effect constitute a universal joint connection, without however requiring the mechanical connection of the parts to each other. This being the case the gear case 20 may be mounted on the housing of the motor without greater accuracy than the screws 21 themselves afford and again, the plate 23 may be similarly located on the gear case and any inaccuracies resulting from the location of the gear case or from the location of the plate on the gear case are readily taken care of by the loose driving connection described between the shaft 11 and the shaft 19.

It will be obvious that my improved driving mechanism may be used effectively for other purposes than that shown and described above and I do not therefore limit myself to using this connection for driving an oil pump. It will also be observed that by housing the oil pump as described, a more compact construction is the result than where the pump is mounted in the usual manner, as for example on the base of the motor, and further, that the oil pump is merely illustrative and that any other driven instrumentality may if preferred be mounted on the gear case as described and similarly driven.

While I have shown my invention in the particular embodiment above described, it will be understood that I do not limit myself to this exact construction, as I may employ equivalents known to the art at the time of the filing of this application without departing from the scope of the appended claims.

What I claim is:

1. In combination, a housing, a shaft mounted to rotate in the housing, a gear secured to the end of the shaft, a gear case secured to the housing for enclosing said gear and having an opening in line with the central portion of said gear, a plate for closing said opening, a pump secured to said plate and having a driving shaft extending towards said gear, and driving connections between said first mentioned shaft and said pump driving shaft.

2. In combination, a housing, a shaft mounted to rotate in the housing, a gear secured to the end of the shaft, a gear case secured to the housing for enclosing said gear and having an opening in line with the central portion of said gear, a plate for closing said opening, a pump secured to said plate and having a driving shaft extending towards said gear, and driving connections between said first mentioned shaft and said pump driving shaft, said driving connections comprising a stud projecting axially from said first mentioned shaft and a bar carried by said pump driving shaft and projecting radially therefrom into the path of said stud.

3. In combination, a housing, a shaft mounted to rotate in the housing, a gear secured to the end of the shaft, a gear case secured to the housing for enclosing said gear and having an opening in line with the central portion of said gear, a plate for closing said opening, a pump secured to said plate and having a driving shaft extending towards said gear, driving connections between said first mentioned shaft and said pump driving shaft, each of said shafts extending in the general direction of the other, and a spring between the adjacent ends of said shafts to hold them and the parts carried thereby against rattling.

4. In combination, a housing, a shaft mounted to rotate in the housing, a gear secured to the end of the shaft, a gear case secured to the housing for enclosing said gear and having an opening in line with the central portion of said gear, a plate for closing said opening, a pump secured to said plate and having a driving shaft extending towards said gear, driving connections between said first mentioned shaft and said pump driving shaft, said driving connections comprising a stud projecting axially from said first mentioned shaft and a bar carried by said pump driving shaft and projecting radially therefrom into the path of said stud, each of said shafts extending in the general direction of the other, and a spring between the adjacent ends of said shafts to hold them and the parts carried thereby against rattling.

5. In combination, a housing, a shaft mounted to rotate in the housing, an enclosing casing secured to the housing, a driven device carried by the casing, a driving shaft projecting from said device towards said first mentioned shaft, and driving connections in said casing between said driving shaft and said first mentioned shaft.

6. In combination, a housing, a shaft mounted to rotate in the housing, a gear secured to the end of the shaft, a gear case secured to the housing for enclosing said gear, a driven device carried by the gear case, a driving shaft projecting from said device towards the central part of said gear, and driving connections between said driving shaft and said first mentioned shaft, said driving connections comprising a stud projecting axially from said first mentioned shaft and a bar carried by said driving shaft and projecting radially therefrom into the path of said stud.

7. In combination, a housing, a shaft mounted to rotate in the housing, a gear secured to the end of the shaft, a gear case secured to the housing for enclosing said gear, a driven device carried by the gear case, a driving shaft projecting from said device towards the central part of said gear, driving connections between said driving shaft and said first mentioned shaft, said driving connections comprising a stud projecting axially from said first mentioned shaft and a bar carried by said driving shaft and projecting radially therefrom into the path of said stud, each of said shafts extending in the general direction of the other, and a spring between the adjacent ends of said shafts to hold them and the parts carried thereby against rattling.

8. In combination, a housing, a shaft mounted to rotate in the housing, a gear secured to the end of the shaft, a gear case secured to the housing for enclosing said gear and having an opening in line with the central portion of said gear, a plate for closing said opening, a pump secured to said plate and having a driving shaft extending towards said gear, and driving connections between said first mentioned shaft and said pump driving shaft, said gear having a recess formed in its outer face and said pump projecting into said gear case and contained in part of said recess.

9. In combination, a motor housing, a gear rotatably carried by the housing, a gear case removably secured to the housing for enclosing said gear, an oil pump carried by the gear case and having a driving shaft projecting inwardly towards the central portion of said gear, and driving connections between said gear and shaft.

10. In combination, a motor housing, a gear rotatably carried by the housing, a gear case removably secured to the housing for enclosing said gear, an oil pump carried by the gear case and having a driving shaft projecting inwardly towards the central portion of said gear, and driving connections between said gear and shaft, said driving connections comprising a stud projecting axially from said gear and a bar carried by said shaft and projecting radially therefrom into the path of said stud.

11. In combination, a motor housing, a gear rotatably carried by the housing, a gear case removably secured to the housing for enclosing said gear, an oil pump carried by the gear case and having a driving shaft projecting inwardly towards the central portion of said gear, and driving connections between said gear and shaft, said driving connections comprising a stud projecting axially from said gear and a bar carried by said shaft and projecting radially therefrom into the path of said stud and a spring connection between said shaft and said gear for holding the parts against rattling.

12. In combination, a housing, a shaft mounted to rotate in the housing, a gear secured to the end of the shaft, a gear case secured to the housing for enclosing said gear, a driven device carried by the gear case, a driving shaft projecting from said devices towards the central part of said gear, driving connections between said driving shaft and said first mentioned shaft, said gear case having an opening therethrough for receiving said device and a plate secured to said device to support it in said opening and constituting a removable cover plate for said opening.

13. In combination, a motor housing, a cam shaft mounted for rotation in said housing, said shaft having an enlarged head at its end adjacent the outer surface of said housing, a gear mounted on said head, screws extending through said gear into said head to secure said parts together, a gear case mounted on the housing for enclosing said gear, readily removable devices connecting said gear case to said housing, said gear case having an opening therethrough opposite the central portion of said gear, a cover plate for said opening, readily removable devices securing said cover plate in place on said gear case, a driven device carried by said cover plate and projecting therefrom into said gear case, a driving shaft for said driven device extending towards the central portion of said gear, and a bar carried by the end of said driving shaft and projecting radially therefrom in opposite directions into the path of said screws, opposite ones of said screws having extended heads for engaging and rotating said bar.

14. In combination, a motor housing, a cam shaft mounted for rotation on said housing, said shaft having an enlarged head at its end adjacent the outer surface of said housing, a gear mounted on said head, screws extending through said gear into said head to secure said parts together, a gear case mounted on the housing for enclosing said gear, readily removable devices connecting said gear case to said housing, said gear case having an opening therethrough opposite the central portion of said gear, a cover plate for said opening, readily removable devices securing said cover plate in place on said gear case, a driven device carried by said cover plate and projecting therefrom into said gear case, a driving shaft for said driven device extending towards the central portion of said gear, a bar carried by the end of said driving shaft and projecting radially therefrom in opposite directions into the path of said screws, opposite ones of said screws having extended heads for engaging and rotating said bar, said gear having a central bore and said head having a similar bore therein, and a spring in the bore of said head between said head and said driving shaft tending to move said driving shaft and said head away from each other.

15. In combination, a motor housing, a cam shaft mounted for rotation in said housing, said shaft having an enlarged head at its end adjacent the outer surface of said housing, a gear mounted on said head, screws extending through said gear into said head to secure said parts together, a gear case mounted on the housing for enclosing said gear, readily removable devices connecting said gear case to said housing, said gear case having an opening therethrough opposite the central portion of said gear, a cover plate for said opening, readily removable devices securing said cover plate in place on said gear case, a driven device carried by said cover plate and projecting therefrom into said gear case, a driving shaft for said driven device extending towards the central portion of said gear, a bar carried by the end of said driving shaft and projecting radially therefrom in opposite directions into the path of said screws, opposite ones of said screws having extended heads for engaging and rotating said bar, said gear having a central bore and said head having a similar bore therein, a spring in the bore of said head between said head and said driving shaft tending to move said driving shaft and said head away from each other, and a cup carried by the end of said driving shaft forming a seat for one end of said spring.

16. In combination, a motor housing, a cam shaft mounted for rotation in said housing, said shaft having an enlarged head at its end adjacent the outer surface of said housing, a gear mounted on said head, screws extending through said gear into said head to secure said parts together, a gear case mounted on the housing for enclosing said gear, readily removable devices connecting said gear case to said housing, said gear case having an opening therethrough opposite the central portion of said gear, a cover plate for said opening, readily removable devices securing said cover plate in place on said gear case, a driven device carried by said cover plate and projecting therefrom into said gear case, a driving shaft for said driven device extending towards the central portion of said gear, and a bar carried by the end of said driving shaft and projecting radially therefrom in opposite directions into the path of said screws, opposite ones of said screws having extended heads for engaging and rotating said bar, said driven device comprising an oil pump and said gear having a recess in its outer face for containing a portion of said pump.

17. In combination, a housing, a shaft mounted to rotate in the housing, an enclosing casing secured to the housing, a driven device carried by the casing, a driving shaft projecting from said device towards said first mentioned shaft, and driving connections in said casing between said driving shaft and said first mentioned shaft, said driving connections comprising a stud projecting axially from one of said shafts at a distance from the axis of said shaft and a bar carried by the other of said shafts and projecting radially therefrom into the path of said stud.

18. The combination of a gear casing, a gear contained in said casing and forming a part of a motor construction, said casing having an aperture in its end wall in line with said gear, a cover plate for said aperture, and a pump carried by said cover plate to enter said aperture and be contained in said casing when said plate is applied to said casing to close said aperture, said pump having driving connections projecting towards said gear in line with the central portion of said gear for driving engagement therewith.

19. In a motor construction, the combination of a gear casing having an aperture in its end wall, a cover plate for said aperture, and a pump carried by said cover plate for location wholly within said casing when said cover plate is applied to said casing to close said aperture.

20. As a means for mounting and driving a desired assembled unit on and from a motor having a housing, a shaft and a gear on the end of said shaft adapted to be wholly enclosed by a gear case secured to said housing, a gear case for support by said housing to enclose said gear and having an opening in its wall in line with said shaft, a separable cover for said case opening, a pump secured to said cover, and driving connections between said gear and said pump.

21. As a means for mounting and driving a desired assembled unit on and from a motor having a housing, a shaft and a gear on the end of said shaft adapted to be wholly enclosed by a gear case secured to said housing, a gear case for support by said housing to enclose said gear and having an opening in its wall in line with said shaft, a separable cover for said case opening, a pump secured to said cover, and driving connections between said gear and said pump, said driving connections comprising separable and loosely related parts permitting said pump and said gear to be out of axial alignment and at the same time effectively driving said pump.

In witness whereof, I hereunto subscribe my name this 20th day of March, A. D. 1922.

STEVEN F. EVELYN.